No. 844,083. PATENTED FEB. 12, 1907.
L. BARRELLA.
ARM SUPPORT FOR TELEPHONES.
APPLICATION FILED OCT. 31, 1906.
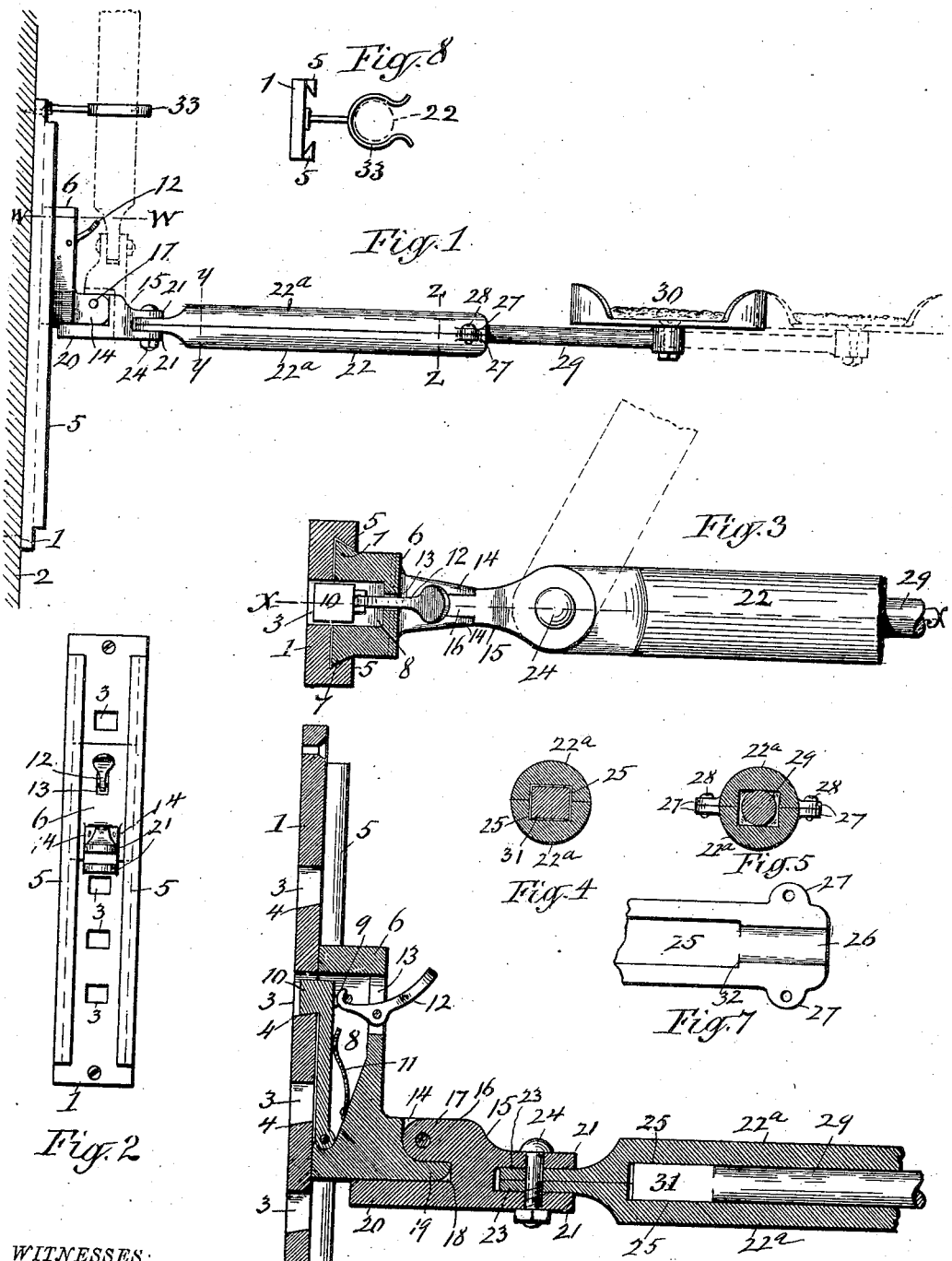
WITNESSES:
INVENTOR:
Louis Barrella
By E. Laass
his ATTORNEY.

UNITED STATES PATENT OFFICE.

LOUIS BARRELLA, OF SYRACUSE, NEW YORK.

ARM-SUPPORT FOR TELEPHONES.

No. 844,083. Specification of Letters Patent. Patented Feb. 12, 1907.

Application filed October 31, 1906. Serial No. 341,431.

*To all whom it may concern:*

Be it known that I, LOUIS BARRELLA, a citizen of the United States, and resident of Syracuse, in the county of Onondaga, in the State of New York, have invented new and useful Improvements in Arm-Supports for Telephones, of which the following, taken in connection with the accompanying drawings, is a full, clear, and exact description.

The object of this invention is to provide a convenient and efficient device for supporting the arm of a person while using the telephone and which device shall have its component parts readily assembled and effectually braced and shall permit all necessary adjustment of the arm-rest to various desired positions and afford proper protection from dust and wear of the joints and connections of its parts.

To that end the invention consists in the improved construction and combination of the component parts of the arm-support hereinafter described and as illustrated in the accompanying drawings, in which—

Figure 1 is a side view of the arm-rest. Fig. 2 is a front view of the stationary supporting-plate with the vertically-adjustable slide and bracket pivoted to said slide. Fig. 3 is an enlarged transverse section on the line W W in Fig. 1. Figs. 4 and 5 are enlarged transverse sections on the lines Y Y and Z Z, respectively, in Fig. 1. Fig. 6 is a vertical longitudinal section on the line X X in Fig. 3. Fig. 7 is a fragmentary plan view of an end portion of one of the sections of the hollow arm-supporting bar, and Fig. 8 is a plan view of the spring-catch which retains the vertically-movable supporting-bar in its elevated position.

1 denotes a vertically-elongated plate, which is securely fastened to a convenient stationary object, (indicated at 2.) Said plate is provided with a vertical series of apertures 3 3, each of which has its bottom portion formed rearwardly inclined, as shown at 4 in Fig. 6, for the purpose hereinafter explained. At opposite sides of the series of apertures and parallel therewith are ribs 5 5, projecting from the front of the plate 1 and undercut on their inner sides.

6 represents a block which is adapted to slide vertically on the front of the plate 1 between the ribs 5 5 and is formed with flanges 7 7, engaging the undercut sides of said ribs, and thus maintaining the said block on the plate 1, as shown in Fig. 3. The block 6 is formed with a cavity 8 in the side facing the plate 1. In the said cavity is located a dog 9, which is thus inclosed and protected. Said dog is pivoted at its lower end to the block 6 and has its upper end formed with a tooth 10, which is shaped to enter one of the apertures 3 at a time. The under side of said tooth is undercut to hook onto the inclined bottom of the aperture, and thus obtain a secure hold to prevent the block from slipping vertically on the plate 1. A spring 11, secured in the cavity 8, presses on the dog 9, so as to force it into the aperture 3 of the plate 1.

12 represents a thumb-latch which is pivoted in a vertical slot 13 in the block 6 and has its inner end suitably connected to the dog 9, near the upper end thereof. By means of said thumb-latch the dog 9 can be drawn out of the aperture 3 of the plate 1, and thus allow the block to be moved up or down, as may be desired by the operator, who upon releasing the thumb-latch allows the dog 9 to automatically enter the proper aperture 3 to retain the block 6 in its desired position. The block 6 is formed with vertical perforated ears 14, projecting from the exterior of the block at the lower portion thereof and having pivoted to them a bracket 15, which is formed with a perforated tongue 16, inserted between the ears 14 and receiving through it a pin 17, passing through the ears.

The bottom portion of the bracket 15 is formed with a longitudinal slot 18 beneath the tongue, which slot is entered by a horizontal integral base 19 of the ears 14, as shown in Fig. 6. Directly under the slot 18 is a horizontal extension 20 of the bracket. This extension bears on the bottom of the block 6 when the bracket 15 is in horizontal position. At the same time the tongue 16 rests on the horizontal base 19. Said bearings of the bracket on the block serve to securely support the said bracket in its horizontal position.

The outer or front end portion of the bracket is formed with perforated horizontal ears 21, in which is pivoted the arm-supporting bar 22, so as to allow the said arm to swing in a horizontal plane. I form the said supporting-bar hollow and divide it longitudinally into two equal sections 22ª and form the rear end of each of said sections with a perforated horizontal lip 23 and insert the two lips jointly between the horizontal ears 21 and pivot them thereto by a pin or bolt 24, passing vertically through said parts. The two sections 22ª are thus secured to each other at said end. The inner side of each section is formed with a longitudinal channel 25, which is angular in cross-section and meets a smaller channel 26, which extends through the outer end portion of the bar-section, as shown in Fig. 7. The two bar-sections are provided with ears 27, projecting from the sides of the outer ends thereof and receiving through them bolts 28, by means of which the said sections are clamped together thereat.

The supporting-bar 22 is provided with an adjustable longitudinal extension 29, to the free end of which is attached a suitable arm-rest 30. The said extension consists of a rod which passes through the end channel 26 of the bar 22 and has its inner end formed with an angular head 31, which is shaped correspondingly to the angular channels 25 in said bar, so as to prevent the rod from turning. The shoulder 32, formed at the junction of the differently-sized channels 25 and 26, serves as a stop to limit the outward movement of the rod 29 by the contact of the head 31 with the said shoulder.

It will be observed that the vertically-adjustable block 6 allows the arm-support to be placed in a higher or lower plane, while the pivotal connection of the bracket 15 to the aforesaid block allows the arm-support to be thrown up and out of the way, as indicated in dotted lines in Fig. 1 of the drawings, and the pivotal connection of the supporting-bar 22 to the bracket allows said arm-support to be swung horizontally into any convenient position for the operator.

33 represents a spring-clasp which is secured in horizontal position to the upper end of the plate 1. The purpose of this clasp is to retain the arm-support in its vertical position when not required to be used.

What I claim as my invention is—

1. An arm-support for telephone consisting of a stationary plate provided with a vertical series of apertures and parallel undercut ribs at opposite sides of said apertures, a vertically-adjustable block provided with flanges engaging said ribs and with a cavity in the side of the block facing the aforesaid plate and with vertical ears projecting from the exterior of the block, a dog inclosed in said cavity and disposed to enter the apertures of the plate, a spring located in the cavity and forcing the dog into the aperture, a thumb-latch pivoted to the block and connected to the dog, a bracket pivoted to the aforesaid ears to swing vertically thereon, and provided with bearings engaging the block to support the bracket in its horizontal position, and horizontal ears projecting from the end of the bracket, a hollow bar pivoted to the horizontal ears, a rod supported longitudinally adjustable in said bar, and an arm-rest attached to the free end of said rod as set forth.

2. An adjustable arm-support for telephone comprising a bracket formed with perforated horizontal ears, a supporting-bar divided longitudinally and formed in the inner sides of its sections with longitudinal channels shaped angular in cross-section and meeting smaller channels extending through the outer ends of the sections, the rear ends of said sections formed with rearwardly-extending horizontal lips inserted jointly between the ears of the bracket and pivoted thereto, screws clamping together the outer ends of the bar-sections, a rod sliding in the channels of the bar-sections and provided at its inner end with an angular head conformed to the angular channels, and an arm-rest attached to the outer end of said rod as set forth and shown.

LOUIS BARRELLA.

Witnesses:
J. J. LAASS,
WM. H. MEIER, Jr.